United States Patent [19]

Carter, Jr.

[11] 4,405,731

[45] Sep. 20, 1983

[54] POLYCARBONATE-STARCH COMPOSITIONS

[75] Inventor: Russell P. Carter, Jr., New Martinsville, W. Va.

[73] Assignee: Mobay Chemical Corporation, Pittsburgh, Pa.

[21] Appl. No.: 339,012

[22] Filed: Jan. 12, 1982

[51] Int. Cl.$^3$ .......................... C08J 5/14; C08L 3/00; C08K 3/34; B32B 27/36
[52] U.S. Cl. ..................... 524/47; 523/206; 524/51; 524/425; 524/448
[58] Field of Search ...................... 523/150, 205, 206; 524/47, 50, 51, 52, 425, 448; 525/4; 428/412, 532

[56] References Cited

U.S. PATENT DOCUMENTS

| | | | |
|---|---|---|---|
| 3,148,172 | 9/1964 | Fox | 260/33.4 R |
| 3,424,703 | 1/1969 | Jones, Jr. | 260/18 |
| 3,720,732 | 3/1973 | Sevenich | 260/860 |
| 3,884,870 | 5/1975 | Dodson et al. | 260/40 R |
| 4,073,766 | 2/1978 | Fein et al. | 260/42.14 |

FOREIGN PATENT DOCUMENTS 2838169 3/1980 Fed. Rep. of Germany .
55-03967 3/1980 Japan .

OTHER PUBLICATIONS

Patent Application-Ser. No. 270,708, filed Jun. 5, 1981, Russell P. Carter, Jr.
Goodman, I., Rhys, J. A., Polyesters, vol. 1, pp. 1-3 & 142-143, London, ILIFFE Books, Ltd., New York, 1965.
"Slip and Antiblock Agents-A Guide to Their Use", by H. W. Mock et al., Plastics Technology, Aug. 1974, p. 41.
"Slip and Antiblocking Agents—Attaining that Delicate Balance", by A. M. Birks, Plastics Technology, Jul. 1977, p. 131.

*Primary Examiner*—John Kight, III
*Assistant Examiner*—Nathan M. Nutter
*Attorney, Agent, or Firm*—Gene Harsh; Lawrence S. Pope; Aron Preis

[57] ABSTRACT

Polycarbonate compositions comprising an aromatic polycarbonate resin, wherein dispersed are starch particulates, are particularly suitable for the preparation of films having a low coefficient of static friction, high light transmission and are virtually free of haze.

15 Claims, No Drawings

POLYCARBONATE-STARCH COMPOSITIONS

FIELD OF THE INVENTION

The present invention is directed to polycarbonate compositions and, more particularly, to aromatic polycarbonate-starch blends.

BRIEF DESCRIPTION OF THE INVENTION

A polycarbonate composition comprising an aromatic thermoplastic polycarbonate resin, wherein dispersed are starch particulates, was found to be especially suitable for the preparation of films of low coefficient of static friction, high light transmission and virtual freedom from haze.

DESCRIPTION OF THE PRIOR ART

Polycarbonate derived from reaction involving organic dihydroxy compounds and carbonic acid derivatives have found extensive commercial application because of their excellent mechanical and physical properties. These thermoplastic polymers are particularly suited for the manufacture of molded articles for which impact strength, rigidity, toughness, thermal and dimensional stability as well as excellent electrical properties are required. Furthermore, polycarbonates are eminently suited for casting or extrusion into films which are characteristically of high clarity, color and oxidative stability as well as flame resistant.

One deficiency of polycarbonate-based films has been the high coefficient of static friction, a factor effecting their handling and somewhat restricting their usefulness. It has been the experience of those skilled in the art that the surfaces of films tend to stick when they are made to slide over similar surfaces, a tendency sometimes referred to as "blockiness", due largely to their high coefficient of static friction.

In this connection, see "Slip and Antiblock Agents-A Guide to Their Use", by H. W. Mock et al, Plastics Technology, August 1974, page 41; "Slip and Antiblocking Agents-Attaining that Delicate Balance," by A. M. Birks, Plastics Technology, July 1977, page 131; and "Does the slip of your web help or hurt its performance?", by R. L. Mueller, Package Engineering, April 1973, page 61.

Attempts to lower that friction by chemical modifiers are not entirely satisfactory in that such modifications adversely affect other, desirable properties of the films. U.S. Pat. No. 3,424,703 teaches lowering the coefficient of friction of polycarbonate films by adding small amounts of either silica or talc.

Also noted in terms of background information is copending Ser. No. 270,708, filed June 5, 1981, directed to antiblock polycarbonate films comprising clays. It is thus an object of the present invention to provide a polycarbonate starch composition suitable for the preparation of films of low static coefficient of friction.

DETAILED DESCRIPTION OF THE INVENTION

The polycarbonate resins useful in the practice of the invention are homopolycarbonates, copolycarbonates and terpolycarbonates or mixtures thereof. The polycarbonates generally have molecular weights of 10,000-200,000 (weight average molecular weight) preferably 20,000-80,000, and are additionally characterized by their melt flow of 1-24 gm/10 min. at 300° C. per ASTM D-1238. These polycarbonates may be prepared, for example, by the known dibasic interface process from phosgene and bisphenols of polycondensation (see German OS Nos. 2,063,050; 2,063,052; 1,570,703; 2,211,956; 2,211,957 and 2,248,817 and French Pat. No. 1,561,518, monograph, "H. Schnell, Chemistry and Physics of Polycarbonates, Interscience Publishers, New York, 1965", all incorporated herein by reference).

The aromatic polycarbonates may be based on the following bisphenols: hydroquinone, resorcinol, dihydroxy diphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphoxides, bis-(hydroxyphenyl)-sulphones and α,α'-bis-(hydroxyphenyl)-diisopropyl benzenes, as well as the corresponding compounds have been described in U.S. Pat. Nos. 3,028,365; 2,999,835; 3,148,172; 3,271,368; 2,991,273; 3,271,367; 3,780,078; 3,014,891 and 2,999,846 and in German OS Nos. 1,570,703; 2,063,050 and 2,063,052 and in French Pat. No. 1,561,518, all incorporated herein by reference.

Preferred aromatic polycarbonates are those in which 5–100 mol % of the structural units correspond to formula (1):

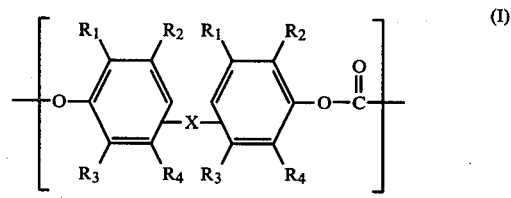

wherein $R_1$, $R_2$, $R_3$ and $R_4 = C_1-C_{10}$ alkyl, Cl, Br, phenyl and H, X=a single bond, —O—, —CO—, S, SO, —SO$_2$, —$C_1-C_{10}$ alkylene, $C_1-C_{10}$ alkylidene, $C_5-C_{15}$ cycloalkylene, $C_5-C_{15}$ cycloalkylidene, $C_7-C_{20}$ cycloalkyl alkylene, $C_6-C_{20}$ cyclo-alkyl alkylidene or

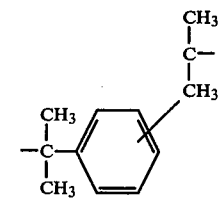

and/or formula (2)

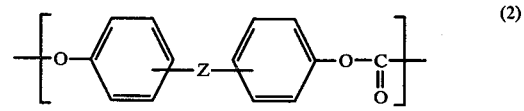

wherein $Z = C_5-C_{20}$ alkylene, $C_5-C_{20}$ alkylidene, $C_5-C_{20}$ cycloalkylene, $C_5-C_{20}$ cycloalkylidene, $C_7-C_{20}$ cycloalkyl alkylene or $C_6-C_{20}$ cycloalkyl alkylidene.

Aromatic polycarbonates containing 5–30 mol % of structural units of formula (1) and/or (2) as well as those containing 50–100 mol % of these structural units are particularly preferred.

Preferred structural units of formula (1) are those of formula (3):

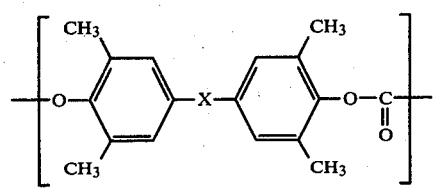

wherein X is as defined above.

The structural units of formula (3) may be based on the following bisphenols, for example: bis-(3,5-dimethyl-4-hydroxyphenyl); bis-(3,5-dimethyl-4-hydroxyphenyl)-ether; bis-(3,5-dimethyl-4-hydroxyphenyl)-carbonyl; bis-(3,5-dimethyl-4-hydroxyphenyl)-sulphone; bis-(3,5-dimethyl-4-hydroxyphenyl)-methane; 1,1-bis-(3,5-dimethyl-4-hydroxyphenyl)-ethane; 1,1-bis-(3,5-dimethyl-4-hydroxyphenyl)-propane; 2,2-bis-(3,5-dimethyl-4-hydroxyphenyl)-butane; 2,4-bis-(3,5-dimethyl-4-hydroxyphenyl)-2-methyl butane; 2,4-bis-(3,5-dimethyl-4-hydroxyphenyl)-butane; 3,3-bis-(3,5-dimethyl-4-hydroxyphenyl)-pentane; 3,3-bis-(3,5-dimethyl-4-hydroxyphenyl)-hexane; 4,4-bis-(3,5-dimethyl-4-hydroxyphenyl)-heptane, 2,2-bis-(3,5-dimethyl-4-hydroxyphenyl)-octane; 2,2-bis-(3,5-dimethyl-4-hydroxyphenyl)-nonane; 2,2-bis-(3,5-dimethyl-4-hydroxyphenyl)-decane; 1,1-bis-(3,5-dimethyl-4-hydroxyphenyl)-cyclohexane; 1,4-bis-(3,5-dimethyl-4-hydroxyphenyl)-cyclohexane; α,α'-bis-(3,5-dimethyl-4-hydroxy-phenyl)-p-diisopropyl benzene; and α,α'-bis-(3,5-dimethyl-4-hydroxy-phenyl)-m-diisopropyl benzene.

These structural units of formulae (1) and (2) which are based on the following bisphenols are particularly preferred: bis-(3,5-dimethyl-4-hydroxyphenyl)methane; 2,2-bis-(3,5-dimethyl-4-hydroxyphenyl)propane; 2,4-bis-(3,5-dimethyl-4-hydroxyphenyl)-2-methyl butane; 1,1-bis-(3,5-dimethyl-4-hydroxyphenyl)cyclohexane; α,α'-bis-(3,5-dimethyl-4-hydroxyphenyl)-p-diisopropyl benzene; 2,2-bis-(3,5-dichloro-4-hydroxyphenyl)-propane; 2,2-bis-(3,5-dibromo-4-hydroxyphenyl)-propane; 1,1-bis-(4-hydroxyphenyl)-cyclohexane; α,α'-bis-(4-hydroxyphenyl)-m-diisopropyl benzene; α,α'-bis-(4-hydroxyphenyl)-p-diisopropyl benzene; 2,4-bis-(4-hydroxyphenyl)-2-methyl butane; 2,2-bis-(3-methyl-4-hydroxyphenyl)-propane; and 2,2-bis-(3-chloro-4-hydroxyphenyl)-propane.

In addition to containing structural units of formulae (1) and (2), the preferred polycarbonates preferably contain structural units of formula (4):

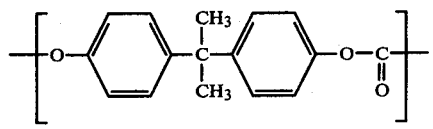

Polycarbonates based solely on the above-mentioned o,o,o',o'-tetramethyl-substituted bisphenols are particularly important; in particular, the homopolycarbonate based on 2,2-bis-(3,5-dimethyl-4-hydroxyphenyl)-propane.

Also suitable for the preparation of the polycarbonates of the invention are dihydroxybenzenes of the structural formula:

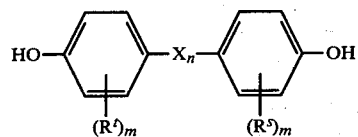

wherein $R^t$ and $R^s$ independently denote $C_1$–$C_{10}$ alkyls, m is an integer of from 0 to 2, X is

or S and n is either 0 or 1.

Among the resins suitable in the practice of the invention are included phenolphthalic-based polycarbonate, copolycarbonates and terpolycarbonates such as are described in U.S. Pat. Nos. 3,036,036 and 4,210,741, both incorporated by reference herein.

In order to obtain special properties, mixtures of various di-(monohydroxyaryl)-alkanes can also be used; thus mixed polycarbonate resins are obtained. By far the most useful polycarbonate resins are those based on 4,4'-dihydroxydiaryl methanes and more particularly bisphenol A [2,2-(4,4'-dihydroxy-diphenyl)propane]. Thus, when flame retardant characteristics are to be imparted to the basic polycarbonate resin, a mixture of bisphenol A and tetrabromobisphenol A [2,2-(3,5,3',5'-tetra-bromo-4,4'-dihydroxydiphenyl)propane] is utilized when reacting with phosgene or a like carbonic acid derivative. Other halogenated phenolic diols are any suitable bis-hydroxyaryl such as the halogenated containing bisphenols such as 2,2'-(3,3,3',5'-tetrachloro-4,4'-dihydroxydiphenol)-propane; 2,2-(3,5,3',5'-tetrabromo-4,4'-dihydroxydiphenol)-propane; 2,2-(3,5-dichloro-4,4'-dihydroxydiphenol)-propane; 2,2-(3,3'-dichloro-5,5'-dimethyl-4,4'-dihydroxyphenol)-propane; 2,2-(3,3'-dibromo-4,4'-dihydroxydiphenol)-propane and the like. These halogenated diols are incorporated into the polycarbonates at levels sufficient to impart flame retardant characteristics. For example, a halogen content of about 3 to 10% by weight is normally sufficient.

The polycarbonates of the invention may also be branched by incorporating small quantities of polyhydroxyl compounds in them by condensation, e.g., 0.05-2.0 mol% (based on the quantity of bisphenols used). Polycarbonates of this type have been described, for example, in German OS Nos. 1,570,533; 2,116,974 and 2,113,347, British Pat. Nos. 885,442 and 1,079,821 and U.S. Pat. Nos. 3,544,514 and 4,185,009, all incorporated by reference herein. The following are some examples of polyhydroxyl compounds which may be used for this purpose: phloroglucinol; 4,6-dimethyl-2,4,6-tri-(4-hydroxyphenyl)-heptane-2; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)-cyclohexyl]-propane; 2,4-bis-(4-hydroxyphenyl)-4-isopropyl)-phenol; 2,6-bis-(2'-dihydroxy-5'-methyl-benzyl)-4-methylphenol; 2,4-dihydroxybenzoic acid; 2-(4-hydroxyphenyl)-2-(2,4-dihydroxyphenyl)-propane; 1,4-bis-(4',4''-dihydroxytriphenylmethyl)-benzene and 3,3-bis-(4-hydroxyphenyl)oxindole.

In addition to the polycondensation process mentioned above and which essentials are described below, other processes for the preparation of the polycarbonates of the invention are polycondensation in a homogeneous phase and transesterification. The suitable processes are disclosed in the incorporated herein by reference U.S. Pat. Nos. 3,028,365; 2,999,846; 3,248,414; 3,153,008; 3,215,668; 3,187,065; 2,964,797; 2,070,137; 2,991,273 and 2,000,835.

The preferred process is the interfacial polycondensation process.

According to the interfacial polycondensation process, copolycarbonate resins are obtained by reacting the aromatic dihydroxy compounds with an alkali metal hydroxide or alkaline earth metal oxide or hydroxide to form the salt of the hydroxy compounds. The salt mixture is present in an aqueous solution or suspension and is reacted with phosgene, carbonyl bromide or bis-chloroformic esters of the aromatic dihydroxy compounds. An organic solvent is provided in the reaction admixture which is a solvent for the polymer but not for the aromatic dihydroxy salts. Thus, chlorinated aliphatic hydrocarbons or chlorinated aromatic hydrocarbons are used as the organic solvent which dissolves the condensation product. In order to limit the molecular weight one may use monofunctional reactants such as monophenols, for example the propyl-, isopropyl- and butyl-phenols, especially p-tert-butylphenol and phenol itself. In order to accelerate the reaction, catalysts such as tertiary amines, quaternary ammonium, phosphonium or arsonium salts and the like may be used. The reaction temperature should be about $-20°$ to $+150°$ C., preferably $0°$ to about $100°$ C.

According to the polycondensation process in a homogeneous phase, the dissolved reaction components are polycondensed in an inert solvent in the presence of an equivalent amount of a tertiary amine base required for absorption of the generated HCl, such as, e.g., N,N-dimethyl-aniline; N,N-dimethyl-cyclohexylamine or, preferably, pyridine and the like. In still another process, a diaryl carbonate can be transesterified with the aromatic dihydroxy compounds to form the polycarbonate resin.

It is to be understood that it is possible to combine in the processes described above in a chemically meaningful way both the aromatic dihydroxy compounds and the monohydroxy compounds in the form of the alkali metal salts and/or bis-haloformic acid esters and the amount of phosgene or carbonyl bromide then still required in order to obtain high molecular products. Other methods of synthesis in forming the polycarbonates of the invention such as disclosed in U.S. Pat. No. 3,912,688, incorporated herein by reference, may be used.

Starches are commonly known polycarbohydrates conforming generally to the formula:

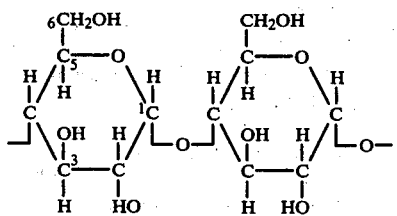

They are composed of about 25% amylose (anhydroglucopyranose units joined by glucosidic bonds) and about 75% amylopectin, a branched-chain structure, available commercially as potato starch or starch obtained from corn, rice, tapioca, wheat, peas, beans, barley, rye or arrowroot among others. Starch has been surprisingly and unexpectedly found to impart desirable anti-blocking and anti-slip properties to polycarbonates.

In the practice of the invention, starches, preferably potato starch or corn starch, may be used provided their moisture content does not exceed 2.0%, preferably 0.5% by weight.

In terms of particle size the starches suitable in the present context average higher than 5 microns, preferably between 10–20 microns, and preferably their average particle size does not exceed 10 microns.

The polycarbonate compositions of the invention may incorporate 0.025 phr to about 1.0 phr, preferably 0.03 to about 0.9 phr, most preferably 0.2 to about 0.9 phr of starch and be thus particularly suitable for the preparation of films which are characterized by their low static coefficient of friction. Further, the starch useful in the present context may be surface treated such as by the application of coupling agents thereon so as to improve its compatibility with the polycarbonate matrix.

Although the results tabulated below, wherein summarized are test results indicative of the inventive concept, are believed clear, the following notes are offered by way of further elucidation:

The results reported in the table were obtained upon testing of the solution cast films and as is well known in the art, these results are indicative of trends to be expected upon the evaluation of extruded films. It should further be noted that the values of the coefficient of friction thus obtained are significantly higher than the values obtainable upon testing the corresponding extruded films. Accordingly, $\mu s$ and $\mu k$ are respectively the static and kinetic coefficients of friction as measured per ASTM D-1894-78. The symbols O-O, O-I and I-I are significant in identifying the surface of the sample tested. The films whose properties are reported below were all cast from solution onto glass and the "air side" of the film is designated as O while the glass side is designated I. The "torture test" is conducted on a 3 oz. injection molding machine at a temperature of 725° F. and molding cycles of one minute and is designed to test the thermal stability of a resinous composition. A skilled operator may determine, by evaluating the parts molded under the processing parameters above, whether the composition suffers thermal degradation, for instance, upon the incorporation of additives thereto. A subjective evaluation indicative of the sufficiency of thermal stability is reported in the table below.

Measurements of melt flow were carried out as an added criteria indicating structural or chemical changes to the resin that may occur upon the addition of starch. An abnormal change in flow, which may indicate depolymerization or cross-linking may point to processing difficulties which can be expected upon the extruding of the compound into films. Surprisingly, the starch used in the present invention appears to have practically no adverse effect on the thermal stability of polycarbonates.

The compositions of polycarbonate-starch of the invention are prepared by blending a polycarbonate resin with a predetermined amount of starch to provide a homogeneous dispersion of the starch in the resin. Such blending may be carried out in any of suitable blenders or mixers commonly used in the art. The preparation of films by the solution casting method, extrusion and by blow molding techniques are described in the monograph, "Chemistry and Physics of Polycarbonates", H. Schnell, Interscience Publishers, 1964, and in "Polycarbonates", by Christopher and Fox, Rheinhold Publishing Corporation, 1962, both incorporated by reference herein. The compositions of the instant invention are suitable for the preparation of thin films (less than 10 mils) of excellent clarity and low static coefficient of friction.

The polycarbonate resin used in the course of the experiments is HMS 3119, a branched polycarbonate resin of 1.29–1.30 relative viscosity (measured on 0.5% solution in methylene chloride) and having a melt flow rate of 1.5–2.5 g/10 min., per ASTM-D 1238 and is a product of Mobay Chemical Corporation. The coefficient of static friction (O-O) of HMS 3119 is about 10.0. The haze and light transmission values of HMS 3119 are 0.4% and 91.9% respectively. The thickness of the films which properties are tabulated below was 1 mil.

EXAMPLES

EXAMPLES A-F

Films of the compositions according to the invention were cast following the procedure outlined above and their properties tested as summarized in Table 1. The compositions containing potato starch performed generally better than the ones employing corn starch but in any case, the compositions appeared to be processable at temperatures up to 600° F.

TABLE 1

| Composition[1] | A | B | C | D | E | F |
|---|---|---|---|---|---|---|
| Additive, phr | | | | | | |
| Corn starch[a] | 0.1 | 0.5 | 0.75 | — | — | — |
| Potato starch[b] | — | — | — | 0.1 | 0.5 | 0.75 |
| Melt flow[2] gm./10 min. | — | 4.7 | — | — | 4.8 | — |
| Torture test[3] | P | P | P | G | G | G |
| Coefficient of friction[4] | | | | | | |
| O-O  $\mu_s$ | 10.15 | .355 | .787 | 10.46 | 5.28 | 7.21 |
|  $\mu_k$ | — | .355 | .711 | — | — | — |
| O-I  $\mu_s$ | 10.15 | .457 | .736 | 3.76 | 5.08 | 1.51 |
|  $\mu_k$ | — | .406 | .533 | 1.35 | 3.13 | .711 |
| I-I  $\mu_s$ | 9.49 | .558 | .959 | 1.70 | 2.69 | 1.07 |
|  $\mu_k$ | — | .761 | .761 | 1.02 | 1.60 | 1.24 |

TABLE 1-continued

| Composition[1] | A | B | C | D | E | F |
|---|---|---|---|---|---|---|
| Light trans-[5] mission, % | 92.0 | 91.8 | 91.9 | 91.9 | 91.8 | 90.9 |
| Haze, %[5] | 0.4 | 1.2 | 1.7 | 0.5 | 1.0 | 1.2 |

[1] the resin used in this series was Merlon HMS 3119
[2] per ASTM D-1238 at 300° C.
[3] see explanatory note in the disclosure, P-poor, F-fair, G-good, E-excellent
[4] per ASTM D-1894-78
[5] per ASTM D-1003-61
[a] S-510 available from Fisher Scientific, Pittsburgh, PA.
[b] S-513 available from Fisher Scientific, Pittsburgh, PA.

EXAMPLES G-P

The compositions reported below contained in addition to the noted starch, either or both of calcium carbonate and diatomaceous earth. These compositions were found to be as suitable as the ones reported in Table 1, for the preparation of films characterized by their low coefficient of friction.

TABLE 2

| Composition[1] | G | H | I | J | K | L | M | N | O | P |
|---|---|---|---|---|---|---|---|---|---|---|
| Additives, phr | | | | | | | | | | |
| Day/cal[2] | .05 | .07 | .05 | .07 | — | — | — | — | .07 | .07 |
| Kenite 801[3] | — | — | — | — | .02 | .02 | .02 | .02 | .09 | .09 |
| Corn starch[a] | .07 | .05 | — | — | .10 | .15 | — | — | .03 | — |
| Potato starch[b] | — | — | .07 | .05 | — | — | .10 | .15 | — | .03 |
| Melt flow[4] gm/10 min. | 3.0 | 2.5 | 2.7 | 2.6 | 3.0 | 2.9 | 2.3 | 3.0 | 2.7 | 2.9 |
| Coefficient of friction | | | | | | | | | | |
| O-O  $\mu_s$ | 4.56 | 5.18 | 4.28 | 3.96 | 2.26 | 5.48 | .609 | 2.40 | 5.01 | .558 |
|  $\mu_k$ | .970 | 2.34 | 1.07 | 1.52 | .914 | 2.49 | .558 | .761 | .914 | .534 |
| O-I  $\mu_s$ | 2.92 | .792 | 4.49 | 2.01 | 2.23 | 3.03 | .665 | 1.51 | 2.58 | 1.74 |
|  $\mu_k$ | .990 | .761 | .965 | .888 | .965 | .763 | .492 | .650 | .787 | .609 |
| I-I  $\mu_s$ | .975 | 4.77 | .711 | .812 | .817 | .812 | .457 | .635 | 1.57 | .548 |
|  $\mu_k$ | 1.24 | 1.07 | 1.14 | .888 | .838 | .736 | .508 | .878 | 1.04 | .528 |
| Light transmission, % | 91.8 | 91.7 | 91.7 | 91.7 | 91.7 | 91.7 | 91.8 | 91.8 | 91.7 | 91.7 |
| Haze % | 0.5 | 0.6 | 0.6 | 1.0 | 0.5 | 0.5 | 0.6 | 0.8 | 0.5 | 0.6 |

[1] the resin used in this series was Merlon HMS 3119
[2] uncoated calcium carbonate from Harrison Ind., Dayton, Ohio
[3] diatomaceous earth from Witco Chemicals, New York
[4] per ASTM D-1238 at 300° C.
[a] S-510 available from Fisher Scientific, Pittsburgh, PA.
[b] S-513 available from Fisher Scientific, Pittsburgh, PA.

Although the invention has been described with reference to specific materials, the invention is only to be limited so far as is set forth in the claims.

What is claimed is:

1. A polycarbonate molding composition comprising an aromatic thermoplastic polycarbonate resin and between 0.025 and 1.0 phr of starch.

2. The composition of claim 1 wherein said starch is selected from the group consisting of corn starch, potato starch, rice starch, tapioca starch, wheat starch, pea starch, bean starch, barley starch, rye starch and arrowroot starch.

3. The composition of claim 1 or claim 2 wherein said phr is between 0.03 and 0.9.

4. The composition of claim 1 or claim 2 further comprising calcium carbonate.

5. The composition of claim 1 or claim 2 further comprising diatomaceous earth.

6. The composition of claim 1 or claim 2 wherein said starch is treated with a coupling agent.

7. The composition of claim 1 or claim 2 wherein said polycarbonate is based on bisphenol A.

8. In the solution cast process for the preparation of films the improvement comprising using a polycarbonate composition comprising an aromatic thermoplastic polycarbonate resin and between 0.025 to 1.0 phr of starch.

9. The process of claim 8 wherein said starch is selected from the group consisting of corn starch, potato starch, rice starch, tapioca starch, wheat starch, pea starch, bean starch, barley starch, rye starch and arrowroot starch.

10. In the extrusion process for the preparation films the improvement comprising using a polycarbonate composition comprising an aromatic thermoplastic polycarbonate resin and between 0.025 to 1.0 phr of starch.

11. The process of claim 10 wherein said starch is selected from the group consisting of corn starch, potato starch, rice starch, tapioca starch, wheat starch, pea starch, bean starch, barley starch, rye starch and arrowroot starch.

12. In the blow molding process for the preparation of films the improvement comprising using a polycarbonate composition comprising an aromatic thermoplastic polycarbonate resin and between 0.025 to 1.0 phr of starch.

13. The process of claim 12 wherein said starch is selected from the group consisting of corn starch, potato starch, rice starch, tapioca starch, wheat starch, pea starch, bean starch, barley starch, rye starch and arrowroot starch.

14. Thin aromatic polycarbonate films of the composition of claim 1 or claim 2.

15. The films of claim 14 having a thickness of about 10 mils or less.

* * * * *